United States Patent
Maguire et al.

(10) Patent No.: US 10,381,621 B2
(45) Date of Patent: Aug. 13, 2019

(54) TRACTION BATTERY ENERGY ABSORBING METHOD AND ASSEMBLY

(71) Applicant: Ford Global Technologies, LLC, Dearborn, MI (US)

(72) Inventors: Patrick Daniel Maguire, Ann Arbor, MI (US); Hyung Min Baek, Fremont, CA (US); Rodolfo Palma, Sr., Canton, MI (US); Yi Zhang, Ann Arbor, MI (US); Stephen Liptak, Livonia, MI (US); Olivia Lomax, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 15/340,918

(22) Filed: Nov. 1, 2016

(65) Prior Publication Data
US 2018/0123101 A1    May 3, 2018

(51) Int. Cl.
*B60K 1/04*    (2019.01)
*H01M 2/10*    (2006.01)

(52) U.S. Cl.
CPC ............. *H01M 2/1094* (2013.01); *B60K 1/04* (2013.01); *H01M 2/1083* (2013.01); *B60K 2001/0438* (2013.01); *B60Y 2306/01* (2013.01); *H01M 2220/20* (2013.01)

(58) Field of Classification Search
CPC ............. B60R 16/04; B60K 2001/04; B60K 2001/0438
USPC ................................. 180/68.5, 232
See application file for complete search history.

(56) References Cited

U.S. PATENT DOCUMENTS

| | | | | |
|---|---|---|---|---|
| 5,378,555 A | * | 1/1995 | Waters | B60K 1/04 180/68.5 |
| 5,392,873 A | * | 2/1995 | Masuyama | B60R 16/04 180/68.5 |
| 5,501,289 A | * | 3/1996 | Nishikawa | B60K 1/04 180/68.5 |
| 5,948,298 A | * | 9/1999 | Ijaz | B60L 1/08 180/68.5 |
| 6,040,080 A | | 3/2000 | Minami et al. | |
| 6,109,380 A | * | 8/2000 | Veenstra | B60R 16/04 180/68.5 |
| 6,224,998 B1 | * | 5/2001 | Brouns | B60R 16/04 429/100 |
| 6,227,322 B1 | * | 5/2001 | Nishikawa | B60R 16/04 180/65.1 |
| 6,276,044 B1 | * | 8/2001 | Ragland | B21D 13/00 29/521 |
| 6,773,437 B2 | | 8/2004 | Ogilvie et al. | |

(Continued)

FOREIGN PATENT DOCUMENTS

| | | |
|---|---|---|
| CN | 102468454 | 5/2012 |
| DE | 102010043899 | 5/2012 |

*Primary Examiner* — Jeffrey J Restifo
(74) *Attorney, Agent, or Firm* — Carlson, Gaskey & Olds, P.C.

(57) ABSTRACT

An exemplary battery pack assembly includes an enclosure having a plurality of horizontally facing sides extending between a first and a second vertically facing side to provide an interior, a component within the interior, and a pocket of the first vertically facing side. The pocket is vertically recessed such that a pocket floor of the pocket is vertically aligned with a portion of the component.

18 Claims, 8 Drawing Sheets

(56) References Cited

U.S. PATENT DOCUMENTS

| | | | | |
|---|---|---|---|---|
| 7,070,015 B2* | 7/2006 | Mathews | | B60K 1/04 180/274 |
| 7,614,469 B2* | 11/2009 | Kumar | | H01M 2/1077 180/68.5 |
| 8,110,300 B2* | 2/2012 | Niedzwiecki | | H01M 2/0245 429/100 |
| 9,216,638 B2* | 12/2015 | Katayama | | B60K 1/04 |
| 9,246,148 B2 | 1/2016 | Maguire | | |
| 9,331,321 B2* | 5/2016 | Berger | | H01M 2/1094 |
| 9,437,851 B2* | 9/2016 | Quinn | | H01M 2/1077 |
| 9,623,742 B2* | 4/2017 | Ikeda | | B60K 1/04 |
| 9,758,028 B2* | 9/2017 | Ikeda | | B60K 1/04 |
| 9,758,029 B2* | 9/2017 | Hokazono | | B60K 1/04 |
| 2006/0166087 A1 | 7/2006 | Ogata et al. | | |
| 2009/0186266 A1* | 7/2009 | Nishino | | B60K 1/04 429/120 |
| 2009/0242299 A1* | 10/2009 | Takasaki | | B60K 1/04 180/68.5 |
| 2010/0273040 A1* | 10/2010 | Kubota | | B60K 1/04 429/100 |
| 2011/0143179 A1* | 6/2011 | Nakamori | | B60K 1/04 429/99 |
| 2012/0103714 A1 | 5/2012 | Choi et al. | | |
| 2012/0115000 A1* | 5/2012 | Hashimura | | B60K 1/04 429/100 |
| 2012/0156539 A1 | 6/2012 | Honjo et al. | | |
| 2013/0026786 A1* | 1/2013 | Saeki | | B60K 1/04 296/187.12 |
| 2013/0045398 A1* | 2/2013 | Katano | | B60K 1/04 429/7 |
| 2013/0075173 A1* | 3/2013 | Kato | | B60K 1/04 180/68.5 |
| 2013/0118824 A1* | 5/2013 | Maeda | | B62D 21/157 180/68.5 |
| 2013/0127200 A1* | 5/2013 | Saeki | | B60K 1/04 296/37.14 |
| 2013/0187371 A1* | 7/2013 | Mauduit | | B60K 1/04 280/781 |
| 2013/0192914 A1* | 8/2013 | Nakamori | | B60K 1/04 180/68.5 |
| 2013/0229030 A1* | 9/2013 | Yamaguchi | | B60K 1/04 296/193.07 |
| 2014/0158443 A1* | 6/2014 | Lee | | B60R 16/04 180/68.5 |
| 2014/0246259 A1* | 9/2014 | Yamamura | | B60K 1/04 180/68.5 |
| 2014/0262573 A1* | 9/2014 | Ito | | B60K 1/04 180/68.5 |
| 2014/0284125 A1* | 9/2014 | Katayama | | B60K 1/04 180/68.5 |
| 2014/0291046 A1* | 10/2014 | Araki | | B60K 1/04 180/68.5 |
| 2014/0338999 A1* | 11/2014 | Fujii | | B60K 1/04 180/68.5 |
| 2015/0174996 A1* | 6/2015 | Ikeda | | B60K 1/04 180/68.5 |
| 2015/0249240 A1* | 9/2015 | Hihara | | B60K 1/04 180/68.5 |
| 2015/0255764 A1* | 9/2015 | Loo | | H01M 2/1083 429/149 |
| 2015/0318525 A1* | 11/2015 | Maguire | | H01M 2/1083 429/96 |
| 2016/0068195 A1* | 3/2016 | Hentrich | | B60K 1/04 180/68.5 |
| 2016/0114667 A1* | 4/2016 | Ikeda | | B60K 1/04 180/68.5 |
| 2016/0114699 A1* | 4/2016 | Hokazono | | B60L 11/1877 180/68.5 |
| 2016/0126535 A1 | 5/2016 | Qiao et al. | | |
| 2016/0236713 A1* | 8/2016 | Sakaguchi | | B60K 1/04 |
| 2016/0311301 A1* | 10/2016 | Ikeda | | B60K 1/04 |
| 2016/0339774 A1* | 11/2016 | Hayashi | | B60K 1/00 |
| 2016/0375750 A1* | 12/2016 | Hokazono | | B60K 1/04 180/68.5 |
| 2017/0036524 A1* | 2/2017 | Ikeda | | B60K 1/04 |
| 2017/0066313 A1* | 3/2017 | Shirai | | B60K 1/04 |
| 2017/0087972 A1* | 3/2017 | Hara | | B62D 25/2027 |
| 2017/0088182 A1* | 3/2017 | Hara | | B60K 1/04 |

\* cited by examiner

TRACTION BATTERY ENERGY ABSORBING METHOD AND ASSEMBLY

TECHNICAL FIELD

This disclosure relates to an enclosure for a traction battery of an electrified vehicle. The enclosure incorporates, among other things, recessed pockets as energy absorbing features.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery can be used to selectively power the electric machines and other electrical loads of the electrified vehicle. The traction battery includes a plurality of interconnected battery cells that store energy for powering these electrical loads. The battery cells are typically housed within an enclosure. Traditionally, enclosures are a metal or metal alloy. Some enclosures are now polymer-based.

SUMMARY

A battery pack assembly according to an exemplary aspect of the present disclosure includes, among other things, an enclosure having a plurality of horizontally facing sides extending between a first and a second vertically facing side to provide an interior. A component is within the interior. A pocket of the first vertically facing side is vertically recessed such that a pocket floor of the pocket is vertically aligned with a portion of the component.

In a further non-limiting embodiment of the foregoing assembly, the pocket floor is generally planar and includes at least one rib extending from the pocket floor into the pocket.

In a further non-limiting embodiment of any of the foregoing assemblies, the pocket floor is disposed along a plane that is generally horizontal.

A further non-limiting embodiment of any of the foregoing assemblies includes a plurality of pocket walls extending from the pocket floor to an area of the first vertically facing side.

In a further non-limiting embodiment of any of the foregoing assemblies, a perimeter of the pocket is provided entirely by the plurality of pocket walls.

In a further non-limiting embodiment of any of the foregoing assemblies, the pocket is configured to interface with a surface of the component, and the pocket has a length in a direction normal to the surface that is less than a vertical height of the pocket.

In a further non-limiting embodiment of any of the foregoing assemblies, the component is a battery array including a plurality of battery cells disposed along an axis and the length is an axial length. The pocket extends between the battery array and a second component housed within enclosure.

In a further non-limiting embodiment of any of the foregoing assemblies, a first portion of a perimeter of the pocket is provided by the plurality of pocket walls and a second portion of the perimeter is open to a horizontally facing side of the enclosure.

In a further non-limiting embodiment of any of the foregoing assemblies, the enclosure is polymer-based.

In a further non-limiting embodiment of any of the foregoing assemblies, the pocket and the remaining portions of the first vertically facing side are portions of a single monolithic structure.

In a further non-limiting embodiment of any of the foregoing assemblies, the vertically facing side is a vertical top side of the enclosure.

A further non-limiting embodiment of any of the foregoing assemblies includes a tray providing one of the first or second vertically facing side, and a cover providing the other of the first or second vertically facing side. The tray is secured to cover at an interface that is uninterrupted by the pocket.

In a further non-limiting embodiment of any of the foregoing assemblies, the pocket is a first pocket, and the second vertically facing side includes a second pocket that is vertically recessed such that a pocket floor of the second pocket is vertically aligned with another portion of the component.

A further non-limiting embodiment of any of the foregoing assemblies includes an energy absorbing filler material held within the pocket.

A further non-limiting embodiment of any of the foregoing assemblies includes an expanded polymer material disposed horizontally between the component and at least one of the plurality of horizontally facing sides, or disposed horizontally between another component held within the enclosure and at least one of the plurality of horizontally facing sides.

A further non-limiting embodiment of any of the foregoing assemblies includes an expanded polymer material disposed on a vertical top surface of the enclosure. The expanded polymer material is configured to compress between the vertical top surface and a portion of a vehicle frame when the enclosure is mounted to the vehicle frame.

In A further non-limiting embodiment of any of the foregoing assemblies, the pocket is a first pocket extending from the first vertically facing side, and the assembly further includes a second pocket extending from the second vertically facing side. The first pocket has a first pocket floor joined to a second pocket floor of the second pocket.

An energy absorbing method according to another exemplary aspect of the present disclosure includes, among other things, absorbing energy by deforming a pocket that is recessed within a vertically facing side of an enclosure. The pocket having a pocket floor that is vertically aligned with a portion of a traction battery component held within the enclosure.

In a further non-limiting embodiment of the foregoing method, the enclosure is a polymer-based material, and the pocket is molded together with the vertically facing side.

In a further non-limiting embodiment of any of the foregoing methods, the deforming comprises crushing the pocket, bending the pocket, severing the pocket, or some combination of these.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure is directed toward a traction battery pack of an electrified vehicle. An enclosure of the exemplary traction battery is polymer-based and incorporates features to absorb energy during, for example, an impact event. The features can extend the duration over which energy is applied during the impact event, which can reduce a peak magnitude of force transmitted to components housed within the enclosure. These and other features are discussed in greater detail in the following paragraphs of this detailed description.

Figure 1:
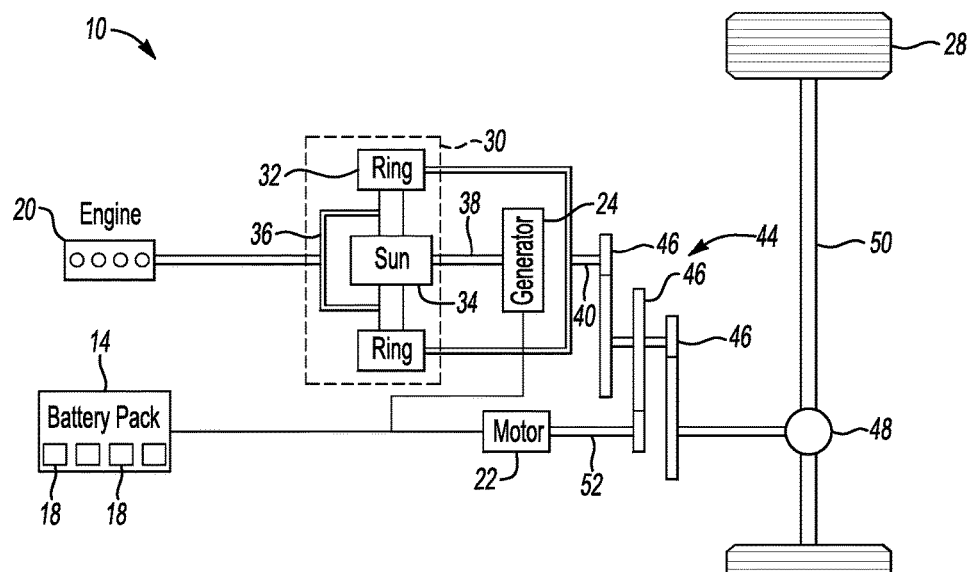
FIG. 1 illustrates a schematic view of an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
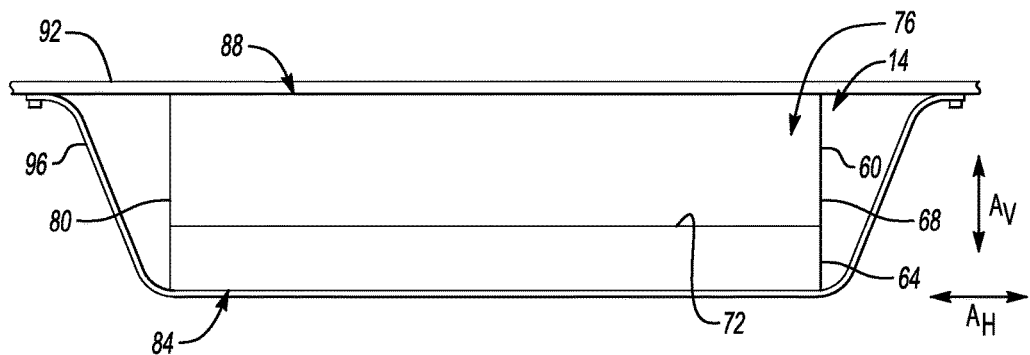
FIG. 2 illustrates a side view of an example battery pack from the powertrain of FIG. 1 secured adjacent to an underbody of the electrified vehicle.

Referring now to FIG. 2 with continued reference to FIG. 1, the battery pack 14 includes an enclosure 60 that houses the plurality of battery arrays 18. The enclosure 60 generally includes a tray 64 and a cover 68. The enclosure 60 is a polymer-based enclosure, such as a thermoplastic. In this example, the exemplary enclosure is a neat, or pure, thermoplastic. Other examples could include other types of thermoplastics and thermosets with reinforcing fibers such as glass or carbon, or other fillers such as talc or glass beads.

The tray 64 is hermetically sealed to the cover 68 along an interface 72. Vibration welding, laser welding, infrared welding, adhesives or other joining methods can be used to secure the tray 64 to the cover 68 and to provide the hermetic seal. The interface 72 extends continuously about a perimeter of the battery pack 14. The tray 64 and the cover 68 provide an interior 76 that holds the arrays 18.

The enclosure 60 has a plurality of horizontally facing sides 80 extending between a bottom vertically facing side 84 and a top vertically facing side 88. In this example, the tray 64 provides the bottom vertically facing side 84 and a portion of the horizontally facing sides 80, and the cover 68 provides the top vertically facing side 88 and another portion of the horizontally facing sides 80.

Vertical and horizontal, for purposes of this disclosure are with reference to ground or the horizon. Thus, vertical, in FIG. 2, extends along a vertical axis Av extending from the bottom vertically facing side 84 to the top vertically facing side 88. A horizontal axis $A_H$ extends in a direction perpendicular to the vertical axis Av.

The battery pack 14 is held against a vehicle frame 92 by at least one strap 96. The strap 96 extends along the bottom vertically facing side 84 of the enclosure 60. Opposing ends of the strap 96 are secured directly to the vehicle frame 92. Securing the strap 96 to the vehicle frame 92 pulls the battery pack 14 vertically upward relative to the vehicle frame 92, which can compress the battery pack 14 between the vehicle frame 92 and the strap 96.

Figure 3:
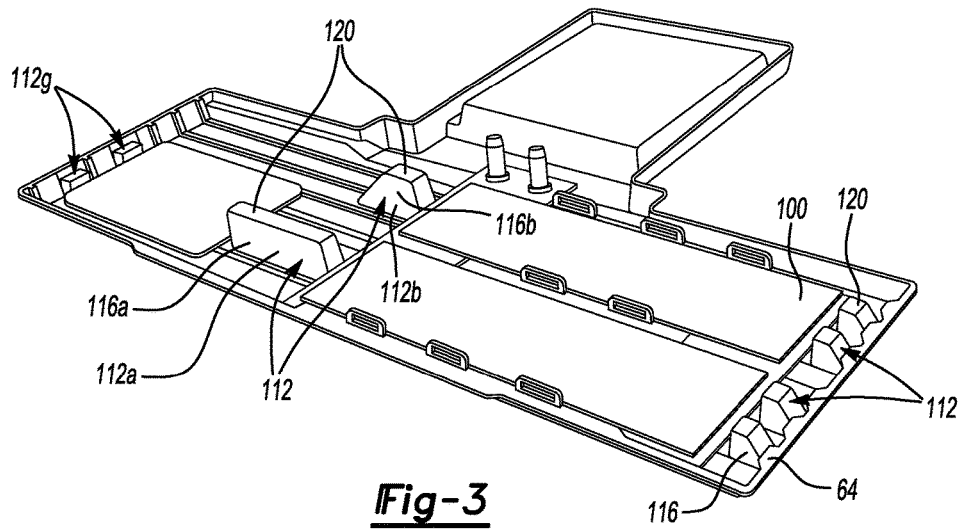
FIG. 3 illustrates a perspective view of a tray of an enclosure from the battery pack of FIG. 2 according to a first exemplary embodiment.
Figure 4:
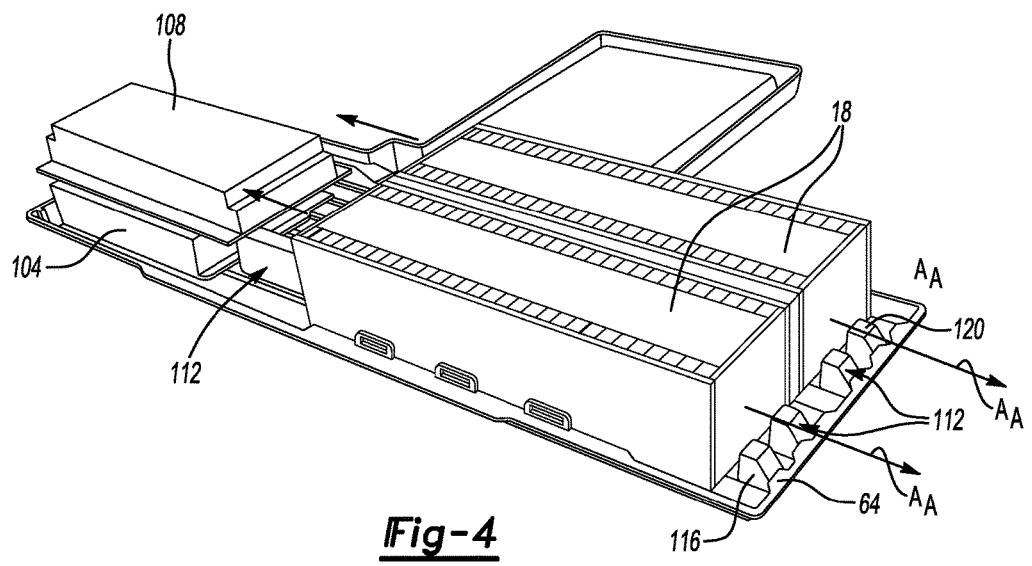
FIG. 4 illustrates the tray of FIG. 3 with two battery arrays and other battery pack components.
Figure 5:
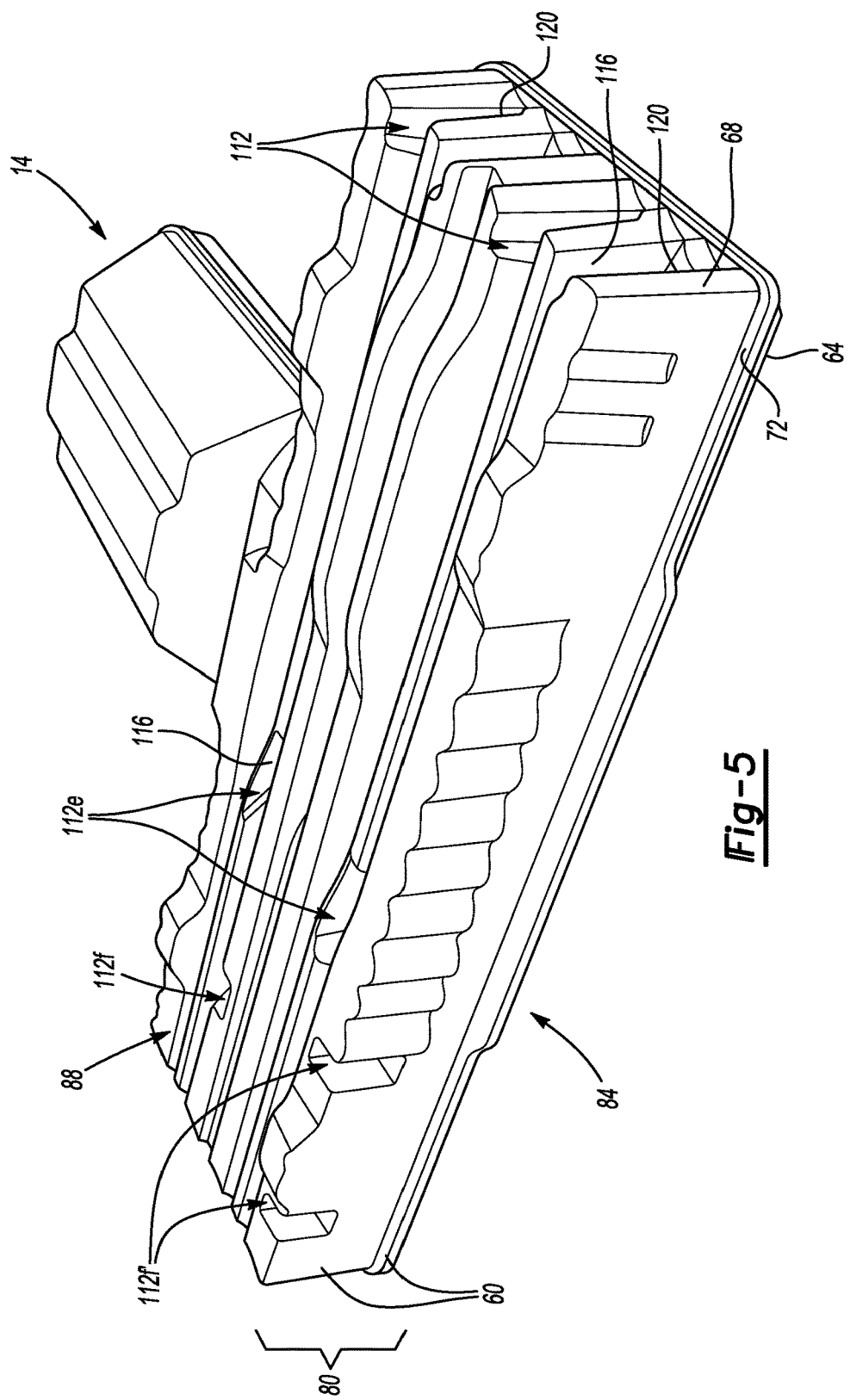
FIG. 5 illustrates the tray of FIG. 3 secured to a cover of the enclosure.

Referring now to FIGS. 3-5 with continuing reference to FIG. 2, the enclosure 60 houses components within the interior 76, such as the arrays 18, a thermal exchange plate 100, a bussed electrical center (BEC) 104, and a battery energy control module (BECM) 108.

The arrays 18 are each disposed along a respective array axis $A_A$. During an impact event, energy from the impact is directed into the battery pack 14. The components within the interior 76 tend to move relatively toward the point of impact. Generally, the degree to which components move towards the point of impact is relative to the mass of the components. Components, with a relatively large mass, such as the arrays, will tend to move more towards the point or side of impact than low mass components provided the components are similarly constrained.

The exemplary enclosure 60 includes features that contact the components during an impact event. The contact can cause the features to initially experience ductile deformation. As energy increases, the deformation can crush the features, bend the features, sever the feature, or some combination of these. The deformation of the features increases the time that that the forces are applied to the components, and absorb some energy during their deformation, both of which reduces a peak magnitude of force transmitted to components housed within the enclosure 60.

The example features are pockets 112. Each of the pockets 112 is a pocket of the bottom vertically facing side 84 or the top vertically facing side 88. Each of the pockets 112 includes a plurality of pocket walls 116 extending from a respective pocket floor 120 to another area of the bottom vertically facing side 84 or another area of the top vertically facing side 88. The pocket floor 120 is vertically recessed relative to the other area such that the pocket floor 120 is vertically aligned with a portion of a component housed within the interior 76. Recessing the pocket 112 such the pocket floor 120 is aligned with a portion of the component can facilitate deformation of the pocket 112 when an impact event causes a load to be applied to the battery pack 14.

When a wall perpendicular to a surface of a component is loaded in a plane of the wall, the wall generally must buckle, crush, or both to give way. Energy absorption can be increased by aligning more walls generally perpendicular to the surface of the component, and by increasing the size of the walls. Here, the pocket floor 120 acts as an additional wall aligned perpendicular to the surface of the component, which can increase the strength of the pocket 112 and its resistance to buckling, crushing, or both, when loaded against the surface. A vertical height of the pocket walls 116 can be increased to further strengthen the pocket 112.

The pockets 112 are formed together, and can be molded together, with the tray 64 or the cover 68. The pockets 112 of the tray 64 project vertically upward and are formed together with the remaining portions of the bottom vertically facing side 84 as a single monolithic structure. The pockets 112 of the cover 68 project vertically downward are formed together with the remaining portions of the top vertically facing side 88 as a single monolithic structure.

Because the pockets 112 are part of the bottom vertically facing side 84 or the top vertically facing side 88, the interface 72 circumferentially surrounds the pockets 112 and is uninterrupted by the pockets 112. The vertical position of the interface 72 can thus remain consistent about the enclosure 60. The interface 72 is positioned vertically relatively low on the enclosure 60 and has a generally rectangular profile in many areas.

In an exemplary embodiment of this disclosure, the pocket floors 120 are planar and generally horizontal. The pocket walls 116 are oriented along a plane that is transverse to the respective pocket floor 120. The pocket walls 116 can taper toward the pocket floor 120, which can help prevent die lock when forming the tray 64 or the cover 68. In some examples, the pockets 112 are designed such that they are molded in via standard, single axis tooling so the pockets 112 do not result in any die lock when molding the tray 64 or the cover 68.

Figure 6:
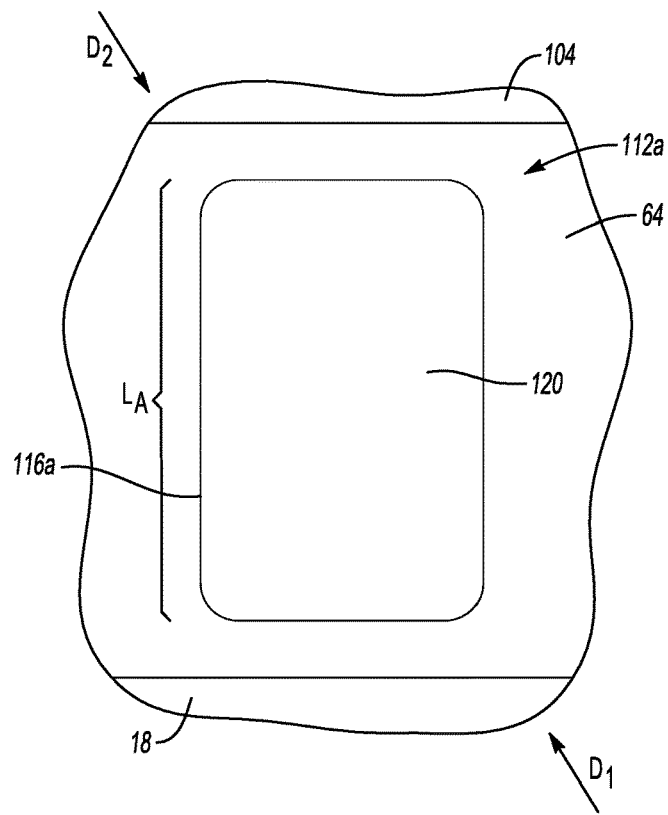
FIG. 6 illustrates a vertical top view of a pocket of the tray of FIG. 3.

The geometries of the pockets 112 can be adjusted based where the pocket 112 is located within the enclosure 60. For example, referring to FIG. 6 with continuing reference to FIG. 3, the pocket 112$a$ has generally rectangular pocket walls 116$a$. The pocket 112$a$ is positioned horizontally between a first component, one of the battery arrays 18, and a second component, the BEC 104. When a force is applied to the battery pack 14 in a direction $D_1$, the pocket walls 116$a$ of the pocket 112$a$ restrict relative movement of the BEC 104. When a force is applied to the battery pack 14 in a direction $D_2$, the pocket walls 116$a$ restricts movement relative movement of the array 18.

Two of the pocket walls 116$a$ are aligned along a plane that is normal to a surface of the array 18 facing the pocket 112$a$ and normal to a surface of the BEC 104 facing the pocket 112$a$.

These two pocket walls 116$a$, and thus the pocket 112$a$, have a length $L_A$ taken along the plane that is normal to the surface of the array 18 facing the pocket 112$a$. In this example, the length $L_A$ is an axial length as the length $L_A$ is taken in the direction of the array axes $A_A$. The pocket 112$a$ has a vertical height that is less than the length $L_A$, which can help to strengthen the pocket 112$a$ when a loaded by the array 18 or the BEC 104.

Figure 7:
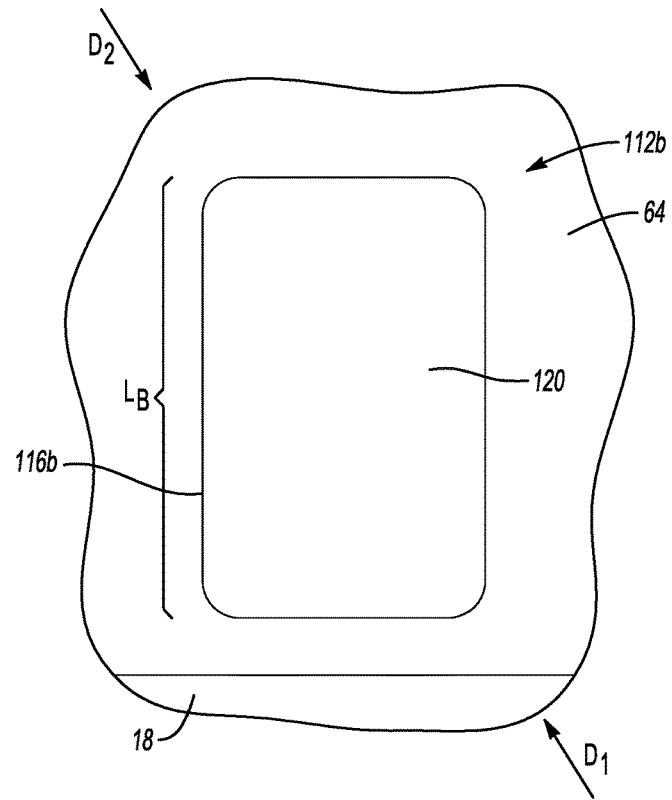
FIG. 7 illustrates a vertical top view of another pocket of the tray of FIG. 3.

Referring to FIG. 7 with continuing reference to FIG. 3, the pocket 112$b$ has a pair of trapezoidal pocket walls 116$b$ disposed along a plane aligned with the array axes $A_A$. The pocket 112$b$ is positioned near another one of the arrays 18, but is laterally spaced from the BEC 104. When a force is applied to the battery pack 14 in a direction $D_2$, the pocket 112$b$ restricts movement relative movement of the array 18. The trapezoidal profile of the pocket walls 116$b$ aligned with the array axes $A_A$ helps to redirect forces from the impact downward toward the bottom vertically facing side 84 of the tray 64. The pocket walls 116$b$ can be trapezoidal since the pocket 112$b$ is laterally spaced from the BEC 104 and does not need to provide resistance to movement of the BEC 104 when a force is applied in a direction $D_1$.

The pocket 112$b$ has an overall length $L_B$ taken along the plane that is normal to the surface of the array 18 facing the pocket 112$b$. The pocket 112$b$ has a vertical height that is less than the length $L_B$, which can help to strengthen the pocket 112$b$ when a loaded by the array 18 or the BEC 104.

Referring again to FIGS. 3-5, the areas at the base of the pockets 112 near the predominate plane of the respective tray 64 or cover 68 can be widened relative to other areas of the pocket walls 116. The widening could occur in a manner that tapers the width to be wider moving away from the pocket floors 120. The widening can make the pockets 112 less prone to folding if, for example, a force applied to the battery pack 14 is not normal to one of the pocket walls 116. Widening the bases of the pockets 112a and 112b can be particularly applicable since these pockets 112a, 112b are relatively large and may be more likely to fold.

Figure 8:
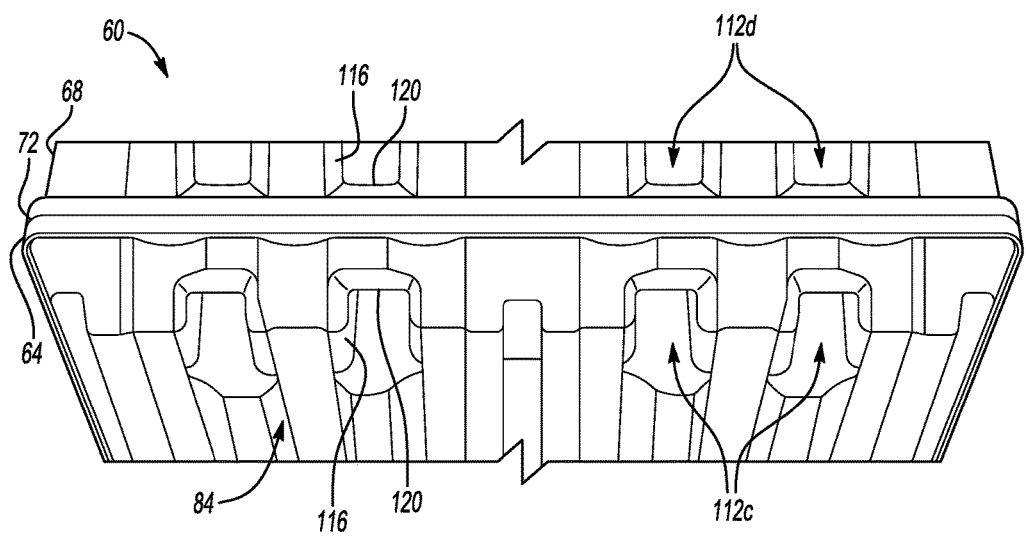
FIG. 8 illustrates a perspective end view of the tray and cover from FIG. 5.

Referring now to FIG. 8, pockets 112c are provided in the tray 64 and pockets 112d are provided in the cover 68. The pocket floors 120 of two of the pockets 112c are vertically aligned with one of the arrays 18, and pocket floors 120 of two of the pockets 112c are vertically aligned with the other of the arrays 18. The pocket floors 120 of two of the pockets 112d are vertically aligned with one of the arrays 18, and pocket floors 120 of two of the pockets 112d are vertically aligned with the other of the arrays 18. Thus, four pockets 112, two in the tray 64 and two in the cover 68, are positioned at an axial end of each of the arrays 18. The four pockets 112 for each of the arrays 18 work together to restrict motion of the respective array 18 when a load is applied to the battery pack 14.

The arrays 18 are vertically taller than the pockets 112c in the tray 64. In this example, the centers of gravity for the arrays 18 are vertically above the pocket floors 120 of the pockets 112c. Thus, under some loads, the arrays 18 could tend to rotate about the pockets 112c if not for the pockets 112d in the cover 68.

The pockets 112d in the cover 68 limit movement of the arrays 18 near a vertical top of the arrays 18, which can inhibit a movement about the pockets 112c from developing.

Referring again to FIG. 5, one of the pockets 112e in the cover 68 is aligned with each of the pockets 112a and 112b. The pockets 112e work to prevent rotation of the array 18 about the pockets 112a and 112b like the pockets 112c and 112d of FIG. 8.

The cover 68 further includes three pockets 112f, 112f′ distributed circumferentially about the BECM 108. The pockets 112f, 112f′ are smaller than the pockets 112e. The pockets 112f have a first portion of their perimeter provided by pocket walls 116, and a second portion of the perimeter open to a horizontally facing side of the enclosure 60.

In contrast to the pockets 112f, the pockets 112e and one of the pockets 112f include four pocket walls 116 substantially defining their entire perimeter. That is, the pockets 112e and 112f do not open to a horizontally facing side of the enclosure. The cover 68, in some examples, could include a channel extending from the pockets 112e, 112f to a horizontally facing side of the enclosure 60 to provide a drainage passageway.

The pockets 112 of the enclosure 60 could be filled with an energy absorbing material, such as an expanded (foamed) polypropylene, polyethylene or polystyrene material. The energy absorbing material can also be a rigid polyurethane foam. If such material were included within the pockets 112e, 112f, the channel for drainage may not be required.

The energy absorbing material could be retained within the pockets 112 by an interference (press) fit, by staking onto clips or Christmas tree features, by locking into ridges formed in the pocket walls 116 or the pocket floors 120, by adhesive bonding, or by other means. Adhesives holding the energy absorbing features within the pockets 112 could be used to inhibit ingress of fluid or contaminates into the pocket 112. Notably, the energy absorbing material could be formed in-situ such that there is no need for, for example, preformed foamed blocks.

Figure 9:
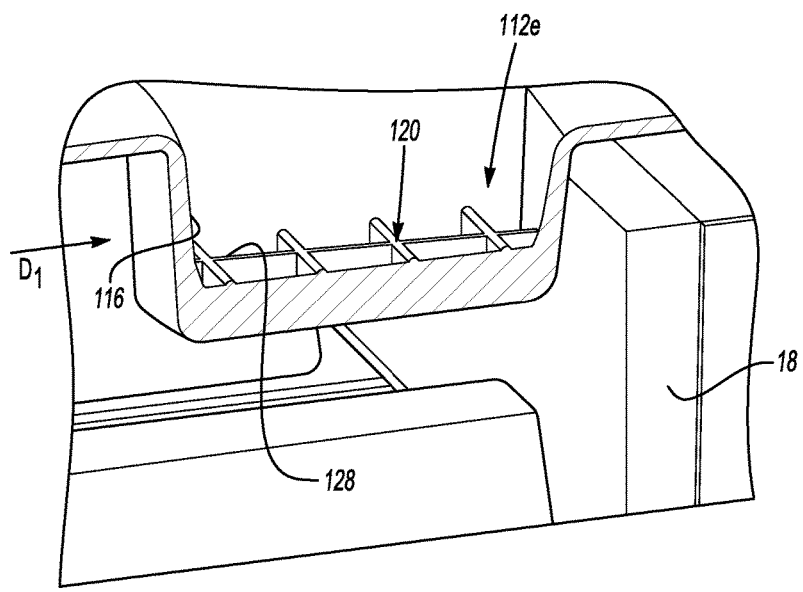
FIG. 9 illustrates a section view of a pocket of the cover from FIG. 5.

Referring to FIG. 9, the pocket 112e of the cover 68 positioned between the array 18 and the BEC 104 includes a lattice of ribs 128 at the pocket floor 120. The ribs 128 could be incorporated instead, or additionally, into the other pockets 112 of the enclosure 60. The ribs 128 could be incorporated into another area of the pocket 112 other than the pocket floor 120, or in addition to the pocket floor 120.

The ribs 128 can strengthen the pocket 112e and inhibit the pocket walls 116 from caving in. The ribs 128 can facilitate transferring a load applied to one pocket wall 116 of the pocket 112e to the opposing pocket wall 116. For example, when a load is applied from a direction $D_1$, the inertia of the array 18 causes it to experience relative movement in a direction opposite the direction $D_1$. The ribs 128 extend, in this example, across the pocket 112e from one of the pocket walls 116 to an opposing one of the pocket walls 116.

As the load moves in the direction $D_1$ through the pocket 112e, the array 18 eventually contacts the pocket 112e. The ribs 128 and the remaining portions of the pocket 112e resist the load from collapsing the pocket 112e so that the pocket 112e can move against the BEC 104 and cause relative movement of the BEC 104 in a direction opposite the direction $D_1$ into the pockets 112g (FIG. 3) at an end of the enclosure 60

The ribs 128 can further increase the strength and resistance to loading of the pocket floor 120 and the remaining portions of the pocket 112e. Molded ribs could instead, or additionally, be incorporated into the pocket walls 116 of the pocket 112e, but the formation of such ribs may be inhibited by tooling and die-lock issues, especially if the vertical height of the pocket 112e is relatively tall. The ribs can increase the failure strength of the pocket 112e by absorbing more energy and increasing the time over which the transmitted energy is applied to the component.

In response to an impact, load is transferred through the components within the enclosure 60. As the loading increases, the pocket 112e, and the other pockets 112, can eventually collapse to absorb more energy and to act as a damper to the crush force. This dampening effect prolongs the duration during which loading energy is applied. An impact event has a finite amount of energy. That amount of energy, applied over a longer duration, results in a reduction of the peak loads experienced by the components within the enclosure 60.

Notably, the lattice of ribs 128 can be revised to include additional ribs, to be taller, thicker etc. to tune loading on the pocket 112e and where the loading should occur.

Figure 10:
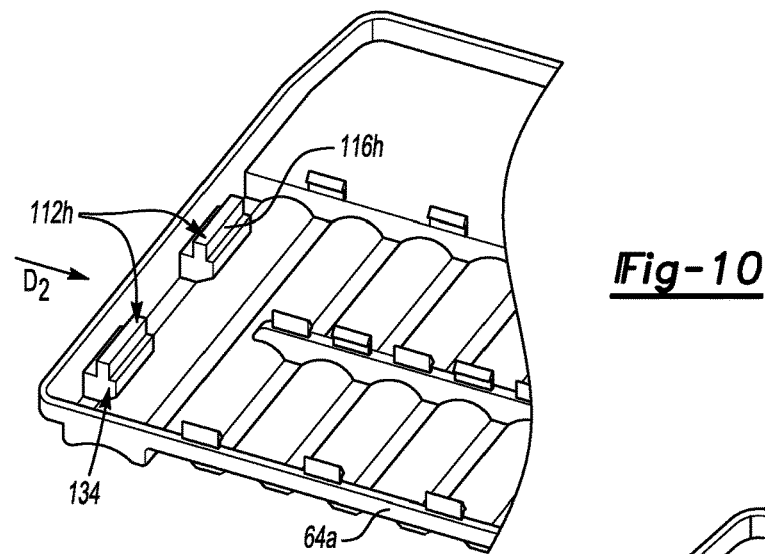
FIG. 10 illustrates a perspective view of a tray of an enclosure according to another exemplary embodiment.
Figure 11:
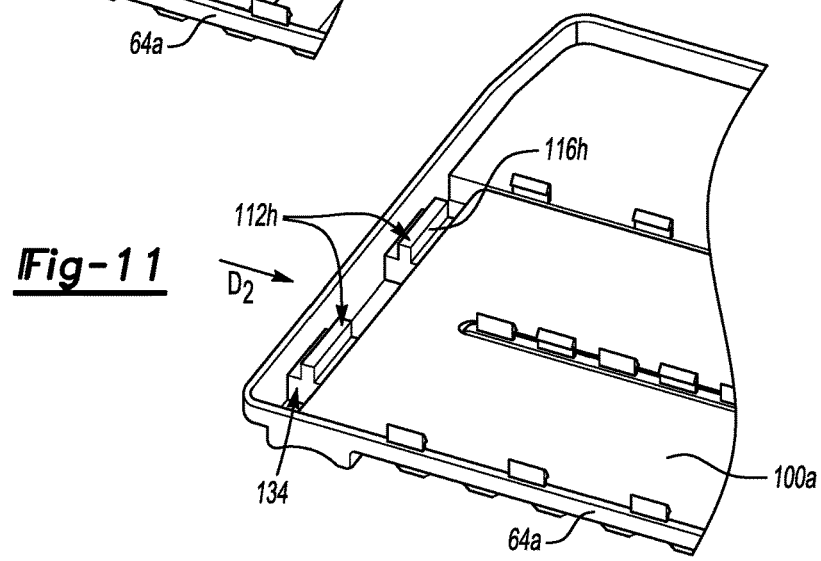
FIG. 11 illustrates the tray of FIG. 10 within a thermal exchange plate.
Figure 12:
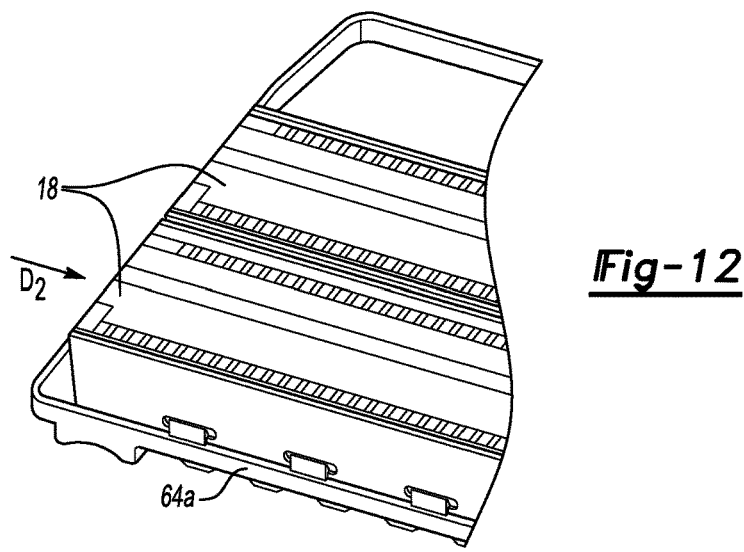
FIG. 12 illustrates two battery arrays disposed on the thermal exchange plate of FIG. 11.

Referring now to FIGS. 10-12, another example enclosure can include a tray 64a with pockets 112h having pocket walls 116h incorporating a ridge 134. A thermal exchange plate 100a rests along the ridge 134, and a portion of the pocket 112h vertically above the thermal exchange plate 100a rests against the arrays 18.

The ridge 134 is incorporated because the arrays 18 extend axially past the thermal exchange plate 100a. If not for the ridge 134, a load applied in a direction $D_2$ would load the arrays 18 prior to the thermal exchange plate 100a. The ridge 134 can resist movement of the arrays 18 and the thermal exchange plate 100a together.

The example tray 64a include one pocket 112h for each end of the arrays 18. The tray 64 of the embodiment depicted in FIG. 8 differs from the tray 64a because, among other things, the tray 64 included two pockets 112h at an end of each array 18.

Although the pockets 112h are described in connection with an end of the tray 64a, pockets having the ridge 134 could be incorporated into another area of the tray 64a or into the cover 68 of the enclosure 60 (FIG. 8).

Figure 13:
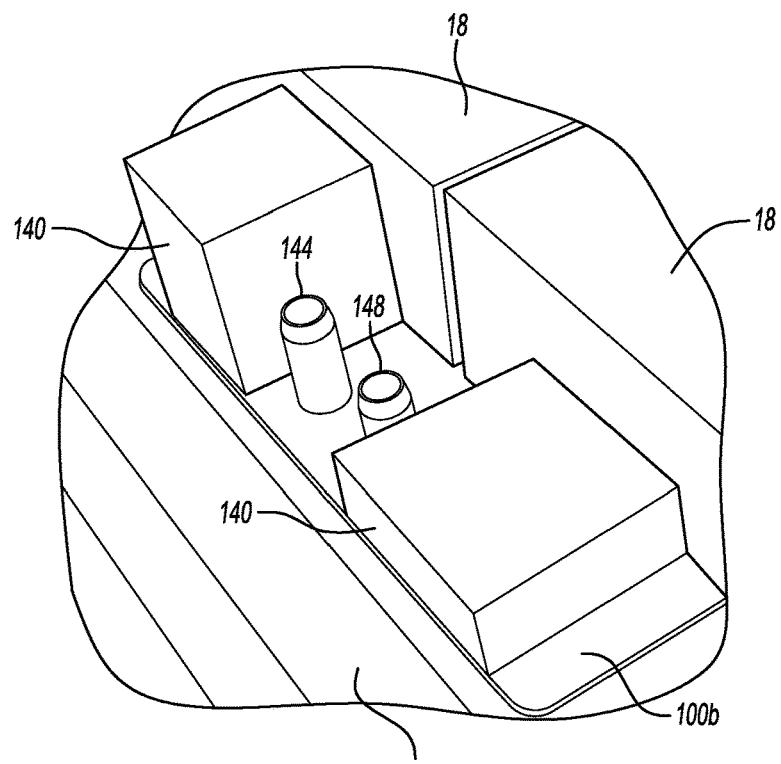
FIG. 13 illustrates an enclosure of a battery pack according to yet another exemplary embodiment with a cover removed to show blocks of energy absorbing material.

Referring to FIG. 13, yet another example enclosure could include at least one block 140 of an energy absorbing material, such as an expanded polymer block, positioned between a component housed within an interior of the enclosure, and a horizontally facing side of an enclosure having a tray 64*b*. The blocks 140 of energy absorbing material can be used if packaging requirements make it particularly difficult to incorporate pockets into the tray 64*b*. Here an inlet 144 and outlet 148 to a thermal exchange plate 100*b* may inhibit incorporating pockets into the tray 64*b*.

The blocks 140 can transmit a load from an impact event between, for example, the arrays 18 and the horizontally facing side of the enclosure having the tray 64*b*. The blocks 140 can additionally absorb some energy of the load. Blocks 140 could be made from different foam materials, have different densities, sizes, and/or geometries to achieve desired performance when loads are applied in different amounts or directions.

Although the blocks 140 are described in connection with an end of the tray 64*b*, one or more blocks 140 could be incorporated into another area of the tray 64*a* or into the cover 68 of the enclosure 60 (FIG. 8).

Figure 14:
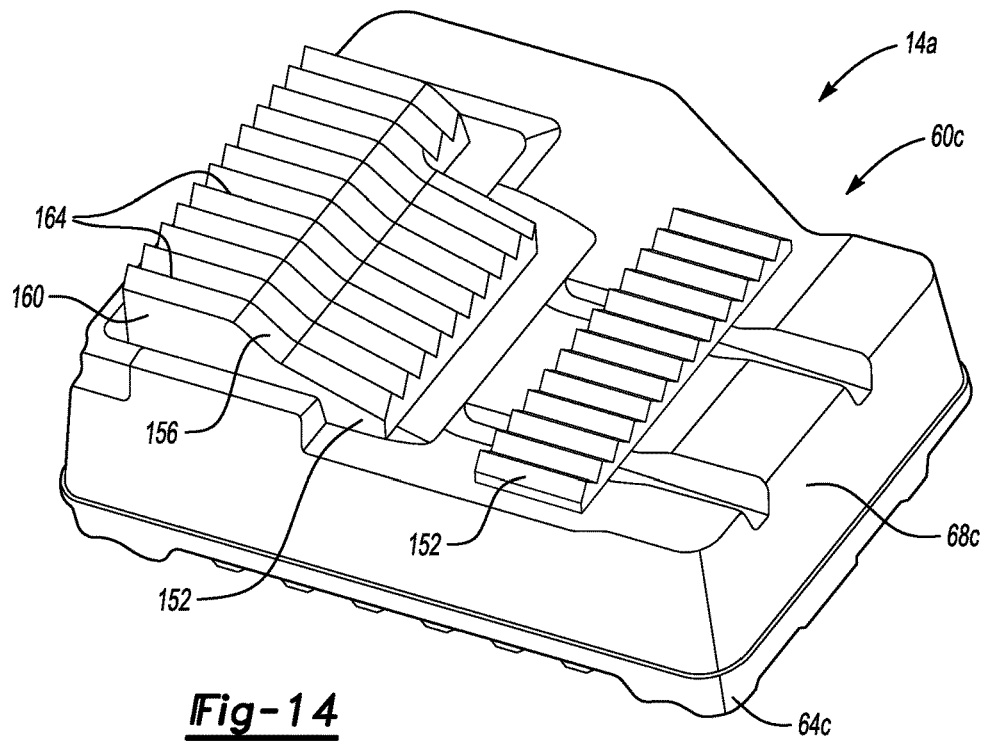
FIG. 14 illustrates a perspective view of an enclosure of a battery pack according to yet another exemplary embodiment.

Referring to FIG. 14, another example battery pack 14*c* can include an enclosure 60*c* having one or more compressible spacers 152 disposed on a cover 68*c*. The exemplary compressible spacers 152 each include a series of projections 156 extending from a base 160 to respective tip portions 164. When the battery pack 14*c* is mounted to the vehicle frame 92 (FIG. 2), the compressible spacers 152 are compressed and fills gaps between the cover 68*c* and the vehicle frame 92.

In this example, the compressible spacers 152 are made of an elastomer. The compressible spacers 152 permit some compliance between the battery pack 14*c* and the vehicle frame 92 as the straps 96 pull the battery pack 14*c* toward the vehicle frame 92. The compliance may help in the spring retention, as well as dampen out some of the vibratory loads that would otherwise be transmitted between the vehicle frame 92 and the battery pack 14*c*. Without the compressible spacers 152, the battery pack 14*c* could be too rigid to adequately withstand vibratory loads.

Compressible spacers 152 could instead, or additionally, be secured to the tray 64*c* to compress between the tray 64*c* and the straps 96. Although the enclosure 60*c* lacks pockets, the compressible spacers 152 could be used in combination with an enclosure including the pockets 112 as described in connection with the embodiments FIGS. 3-13.

Figure 15:
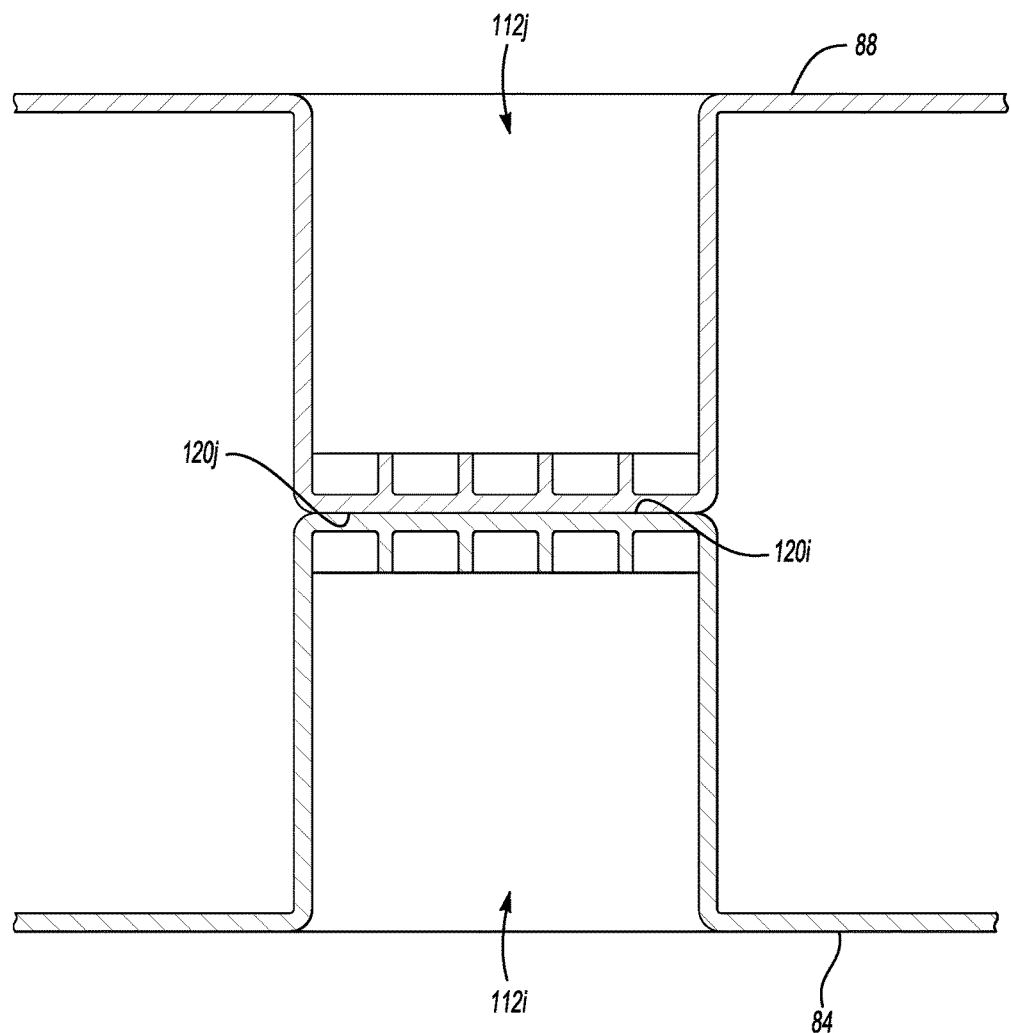
FIG. 15 shows a section view of a portion of a battery pack according to yet another exemplary embodiment.

Referring to the exemplary embodiment of FIG. 15, an example pocket 112*i* extending from the bottom vertically facing side 84 can have a pocket floor 120*i* that is joined to a pocket floor 120*j* of a pocket 112*j* extending from the top vertically facing side 88. The pocket floor 120*i* could be joined to the pocket floor 120*j* using, for example, an infrared welding process. The pocket 112*i* and 112*j* effectively work together as a beam extending from the bottom vertically facing side 84 to the top vertically facing side 88. If the pocket floor 120*i* were spaced from the pocket floor 120*j*, the pockets 112*i* and 112*j* would instead effectively provide cantilevered resistance to loading from components independently from each other.

A feature of some of the examples of this disclosure include pockets that can reduce peak loads experienced by components within a battery pack enclosure. The pockets can be molded with the enclosure another feature is reducing vibratory loads experienced by the battery pack during operation of an electrified vehicle incorporating the battery pack using, for example, energy absorbing blocks, spacers, or both.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery pack assembly, comprising:
   an enclosure having a plurality of horizontally facing sides extending between a first and a second vertically facing side to provide an interior;
   a component within the interior;
   a pocket of the first vertically facing side that is vertically recessed such that a pocket floor of the pocket is vertically aligned with a portion of the component; and
   a plurality of pocket walls extending from the pocket floor to an area of the first vertically facing side, wherein the plurality of pocket walls, the pocket floor, and the first vertically facing side are formed together as a single monolithic structure.

2. The battery pack assembly of claim 1, wherein the pocket floor is generally planar, and further including at least one rib extending from the pocket floor into the pocket.

3. The battery pack assembly of claim 1, wherein the pocket floor is disposed along a plane that is generally horizontal.

4. The battery pack assembly of claim 1, wherein a perimeter of the pocket is provided entirely by the plurality of pocket walls.

5. The battery pack assembly of claim 1, wherein a first portion of a perimeter of the pocket is provided by the plurality of pocket walls and a second portion of the perimeter is open to a horizontally facing side of the enclosure.

6. The battery pack assembly of claim 1, wherein the enclosure is polymer-based.

7. The battery pack assembly of claim 1, wherein the pocket and the remaining portions of the first vertically facing side are portions of a single monolithic structure.

8. The battery pack assembly of claim 1, wherein the vertically facing side is a vertical top side of the enclosure.

9. The battery pack assembly of claim 1, further comprising a tray providing one of the first or second vertically facing side, and a cover providing the other of the first or second vertically facing side, the tray secured to cover at an interface that is uninterrupted by the pocket.

10. The battery pack assembly of claim 1, wherein the pocket is a first pocket, and the second vertically facing side includes a second pocket that is vertically recessed such that a pocket floor of the second pocket is vertically aligned with another portion of the component.

11. The battery pack assembly of claim 1, further comprising an energy absorbing filler material held within the pocket.

12. The battery pack assembly of claim 1, further comprising an expanded polymer material disposed horizontally between the component and at least one of the plurality of horizontally facing sides, or disposed horizontally between another component held within the enclosure and at least one of the plurality of horizontally facing sides.

13. The battery pack assembly of claim 1, further comprising an expanded polymer material disposed on a vertical top surface of the enclosure, the expanded polymer material configured to compress between the vertical top surface and a portion of a vehicle frame when the enclosure is mounted to the vehicle frame.

14. The battery pack assembly of claim 1, wherein the pocket is a first pocket extending from the first vertically facing side, and further comprising a second pocket extending from the second vertically facing side, the first pocket having a first pocket floor joined to a second pocket floor of the second pocket.

15. An energy absorbing method, comprising:
providing a battery pack assembly of claim 1;
absorbing energy by deforming the pocket that is recessed within the vertically facing side of the enclosure;
restricting movement of said traction battery within said enclosure by contact with the pocket floor and pocket walls that are vertically aligned with a portion of a traction battery component held within the enclosure.

16. The energy absorbing method of claim 15, wherein the deforming comprises crushing the pocket, bending the pocket, severing the pocket, or some combination of these.

17. A battery pack assembly, comprising:
an enclosure having a plurality of horizontally facing sides extending between a first and a second vertically facing side to provide an interior;
a component within the interior;
a pocket of the first vertically facing side that is vertically recessed such that a pocket floor of the pocket is vertically aligned with a portion of the component;
further comprising a plurality of pocket walls extending from the pocket floor to an area of the first vertically facing side; and
wherein a perimeter of the pocket is provided entirely by the plurality of pocket walls,
wherein the pocket is configured to interface with a surface of the component, and the pocket has a length in a direction normal to the surface that is less than a vertical height of the pocket.

18. The battery pack assembly of claim 17, wherein the component is a battery array including a plurality of battery cells disposed along an axis and the length is an axial length, wherein the pocket extends between the battery array and a second component housed within enclosure.

* * * * *